United States Patent
Schooler

[19]

[11] Patent Number: 6,045,189

[45] Date of Patent: Apr. 4, 2000

[54] SEAT BACK LOCK WITH PIVOTING LOCKING MEMBER

[76] Inventor: Paul T. Schooler, 16285 Erin, Fraser, Mich. 48026

[21] Appl. No.: 09/150,937

[22] Filed: Sep. 10, 1998

[51] Int. Cl.⁷ .................................................... B60N 2/02
[52] U.S. Cl. ...................................... 297/375; 297/378.12
[58] Field of Search .............................. 297/375, 362.12, 297/378.12, 378.1

[56] References Cited

U.S. PATENT DOCUMENTS

| | | |
|---|---|---|
| 1,326,275 | 12/1919 | Koerner . |
| 1,889,478 | 11/1932 | Hultgren . |
| 2,170,509 | 8/1939 | Schumpert . |
| 2,283,485 | 5/1942 | Beck . |
| 2,728,379 | 12/1955 | Perry . |
| 2,809,691 | 10/1957 | Norwood et al. . |
| 3,226,158 | 12/1965 | Strien et al. . |
| 3,286,971 | 11/1966 | Walter et al. . |
| 3,709,535 | 1/1973 | Rothermel . |
| 3,954,245 | 5/1976 | Costin . |
| 4,178,037 | 12/1979 | Pickles . |
| 4,257,647 | 3/1981 | Gianessi . |
| 4,389,070 | 6/1983 | Chien . |
| 4,565,404 | 1/1986 | Rauschenberger . |
| 4,898,424 | 2/1990 | Bell ....................................... 297/375 X |
| 5,035,466 | 7/1991 | Mathews et al. . |
| 5,080,434 | 1/1992 | Locher . |
| 5,161,856 | 11/1992 | Nishino . |
| 5,320,413 | 6/1994 | Griswold et al. . |
| 5,344,216 | 9/1994 | Suominen . |
| 5,496,092 | 3/1996 | Williams et al. . |
| 5,558,402 | 9/1996 | Yamada . |
| 5,618,083 | 4/1997 | Martone et al. . |
| 5,622,410 | 4/1997 | Robinson . |
| 5,660,440 | 8/1997 | Pejathaya . |

*Primary Examiner*—Milton Nelson, Jr.
*Attorney, Agent, or Firm*—Howard & Howard

[57] ABSTRACT

An improved seat back locking mechanism includes a first toothed rod selectively attached to a seat back. A second toothed member is pivotally received in a block that receives the rod. The second toothed member is spring biased to bring its teeth into engagement with the rod teeth. The second toothed member is selectively rotatable out of engagement with the rod teeth to allow the rod to move, and hence the seat back to pivot over the seat bottom.

4 Claims, 2 Drawing Sheets

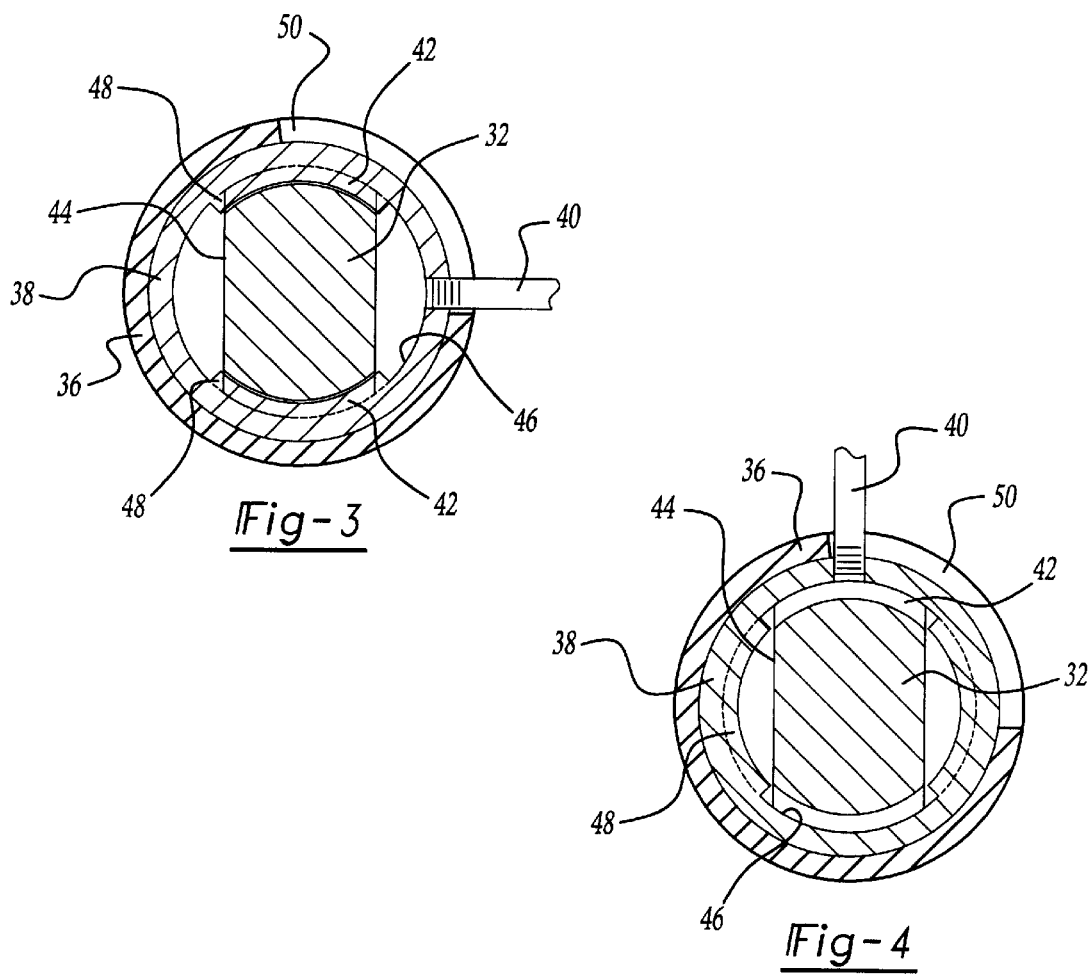
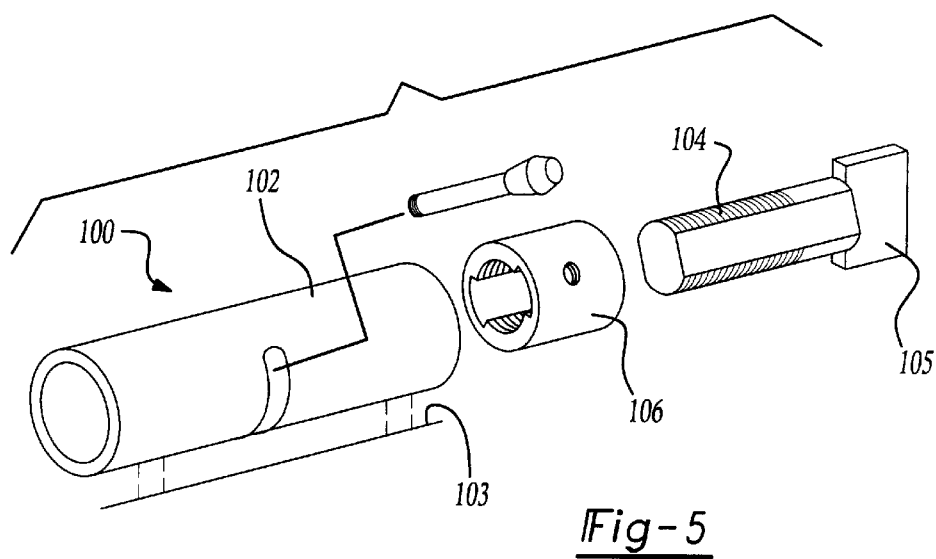

SEAT BACK LOCK WITH PIVOTING LOCKING MEMBER

BACKGROUND OF THE INVENTION

This invention relates to a pivoting seat back lock wherein a locking rod pivots about an axis which is parallel to a bar attached to the seat back to allow for pivoting movement.

Vehicle seat backs are typically connected to the seat bottom for pivoting movement. Thus, the seat is typically connected in some fashion and locked at a use position. However, the seat must also be releasable such that the seat back can pivot over the seat bottom to allow access, such as to the rear of a two door vehicle.

Much design attention has been directed to the mechanisms for selectively holding the seat back at the use position. In particular, very complex mechanisms have been proposed which attempt to lock the seat back at the use position and still allow easy release. These mechanisms must be able to withstand crash forces, and thus there is a good deal of challenge in designing an appropriate mechanism.

In general, the mechanisms have been very complex, and even so have not provided sufficient strength.

SUMMARY OF THE INVENTION

In a disclosed embodiment of this invention, a bar is attached to the seat back and is selectively locked on a seat bottom to hold the seat back at a use position. In particular, a locking rod pivots on an axis which is offset but parallel to the axis of the bar. The locking rod includes a plurality of teeth formed on a locking member. The teeth pivot into mating teeth on the rod. Since the bar teeth pivot about an axis which is parallel to the rod, they must be sized and configured relative to the rod teeth to allow them to pivot into the spaces between the rod teeth. However, once received in the space, the teeth on the locking member provide a very strong holding force. Moreover, the mechanism is quite simple when compared to the prior art.

In a preferred embodiment of this invention, both the rod and the locking bar are received within a block. The block includes a cavity that allows the locking bar to be pivoted to a released position at which the rod can move to allow the seat back to pivot. On the other hand, the locking bar is biased back to a locking position wherein its teeth are received between the rod teeth. A spring normally biases the locking bar to this position, such that the seat will be locked unless released by the operator.

These and other features of the present invention can be best understood from the following specification and drawings, the following of which is a brief description.

BRIEF DESCRIPTION OF THE DRAWINGS

FIG. 3 is a cross-sectional view through a portion of the locking mechanism.

DETAILED DESCRIPTION OF A PREFERRED EMBODIMENT

Figure 1:
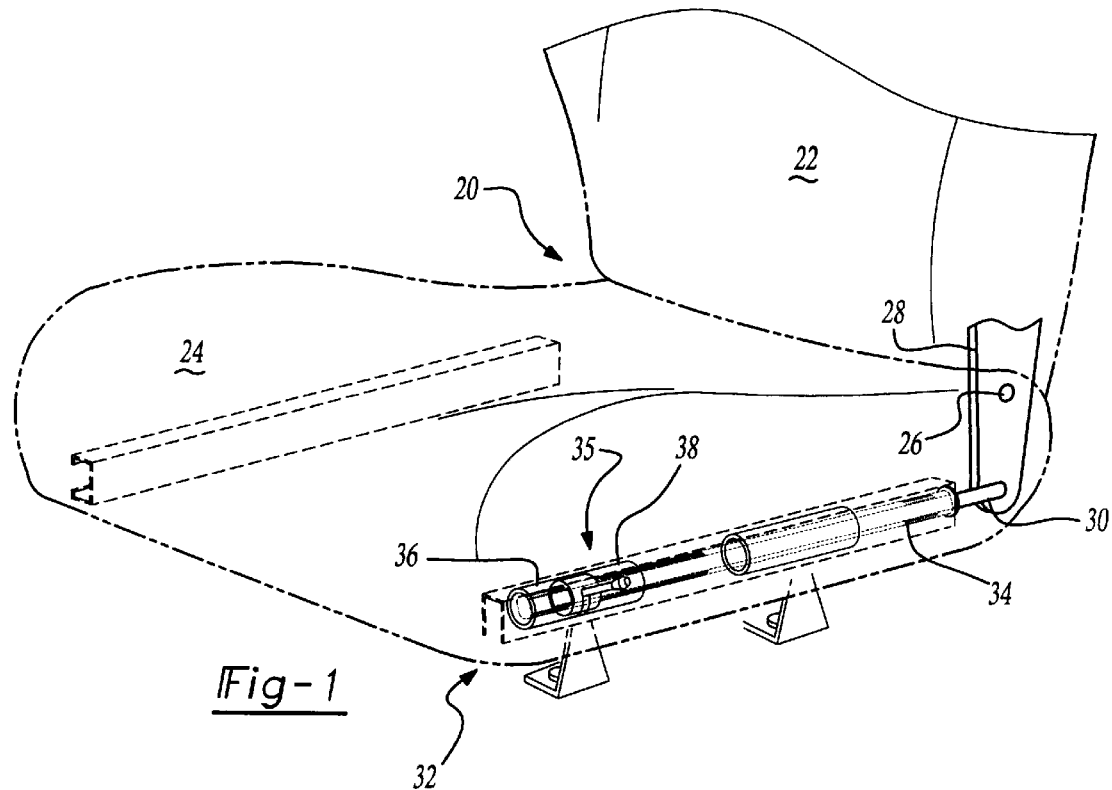
FIG. 1 is a perspective view of a seat.

FIG. 1 shows a seat assembly 20 having a seat back 22 and a seat bottom 24. A locking mechanism 25 includes a handle 26 that allows the locking mechanism 25 to be released. When locked, a pivot point 28 and a rod 30 fix the seat back 22 at the use position shown relative to the seat bottom 24. However, the handle 26 may be turned as shown by the arrow to release rod 30. At that time, the seat back 22 will pivot over the seat bottom. Once the handle 26 is released, a spring will return the handle to the locked position. Preferably, handle 26 is connected to release rods on both sides of the seat.

Figure 2A:
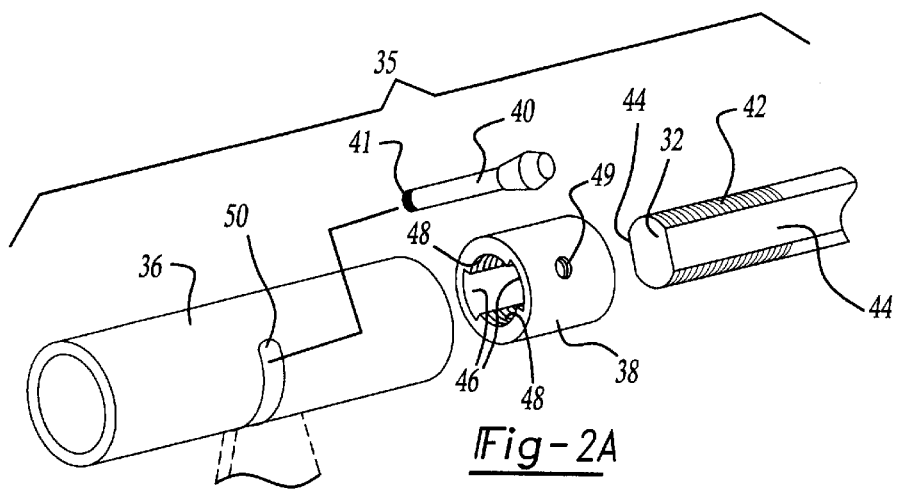
FIG. 2 is an exploded view of a locking mechanism.
Figure 2B:
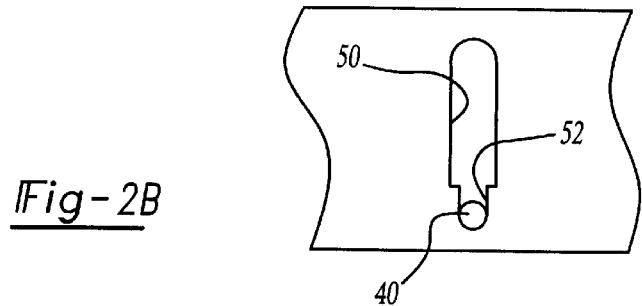
Figure 1:
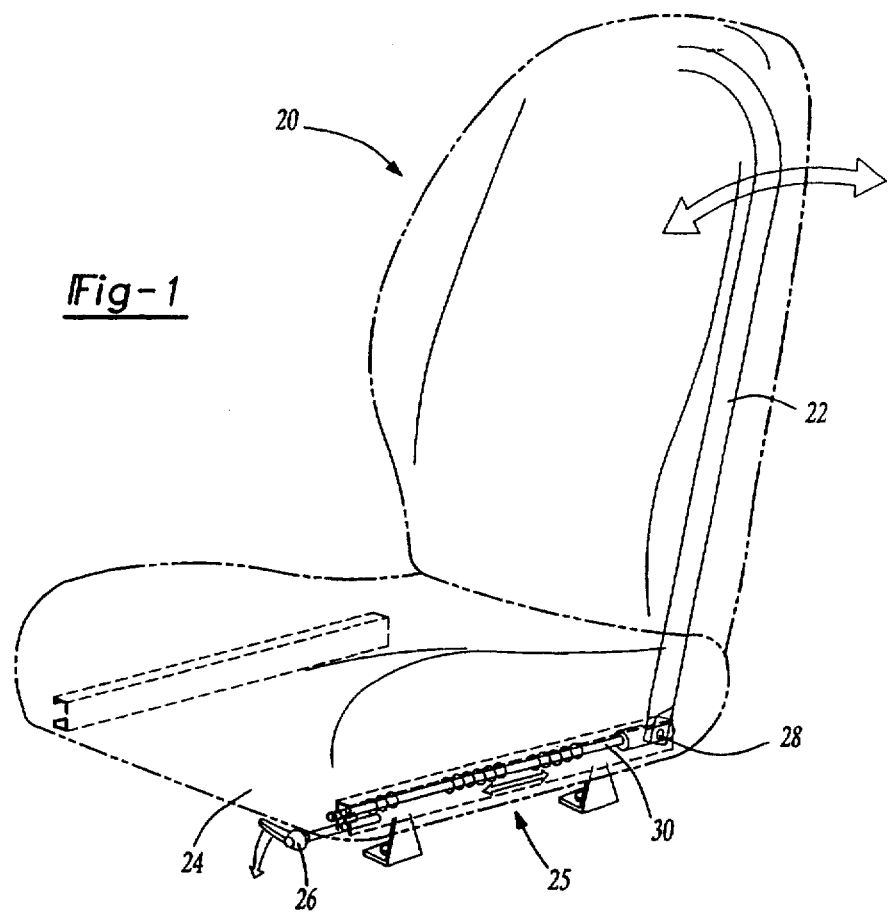

FIG. 2 is an exploded view of the mechanism 25. As shown, rod 30 is pivotally attached at 28 to a portion of the seat back 22. A spring 31 biases the rod within a track 32. Due to spring 31, when rod 30 is released the seat back is driven over the seat bottom. Frame 32 is fixed to the seat bottom 24. A block 34 is also fixed within frame 32. An end plate 36 and another end plate 38 are attached at opposed ends of the block 34. A cavity 40 is formed within the block 34.

The handle 26 rotates a lock bar 42 carrying a locking toothed member 43 having teeth 44. Plates 36 and 38 hold bar 42 in cavity 40. The teeth 44 are selectively moved into mating teeth 46 in rod 30 to lock rod 30, and hence the back 22 at a use position.

As shown in FIG. 3, the locking member 43 and its associated teeth 44 are received between the teeth 46 on the rod 30. In this position, the rod is locked and the seat back 22 will not pivot. As can be appreciated from FIG. 3, there are a plurality of keys on both the bar and the rod spaced along the pivot axis of the bar. Moreover, the rod moves along one axis and the bar pivots on another axis, with the two axes being parallel but offset relative to each other.

Figures 4, 5:
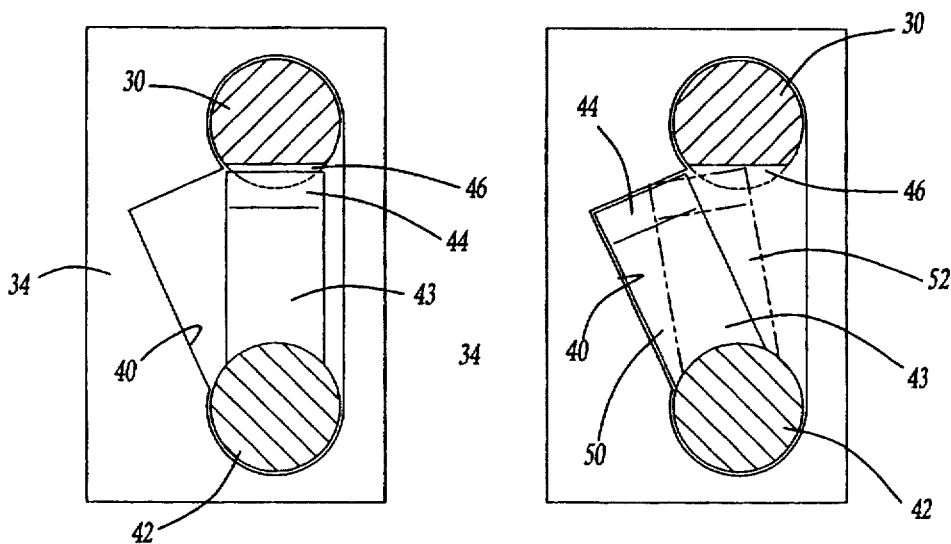
FIG. 4 is a cross-sectional view showing the seat in a locked position.
FIG. 5 shows the unlocked position.
Figure 1:
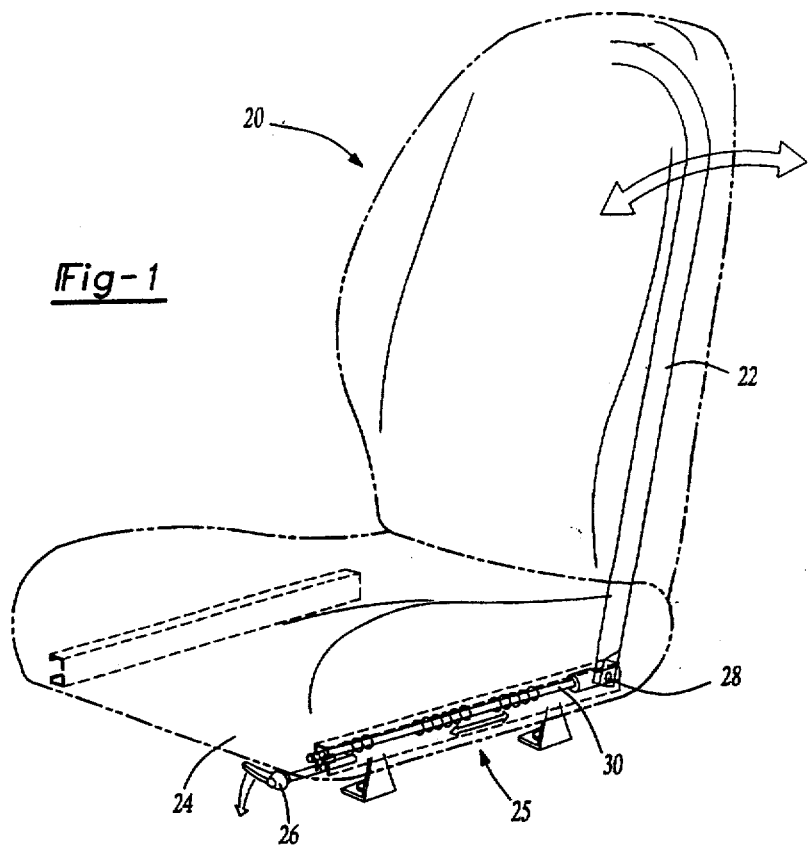
Figure 4:
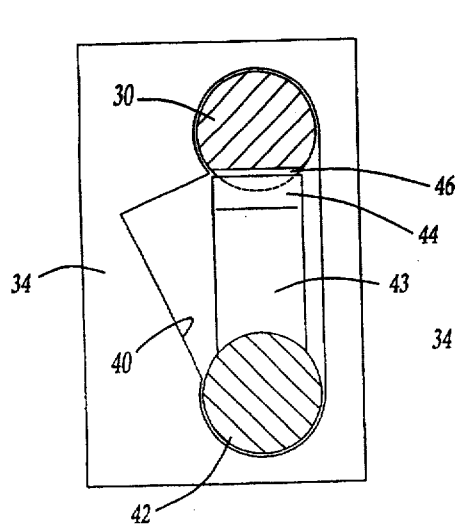
Figure 5:
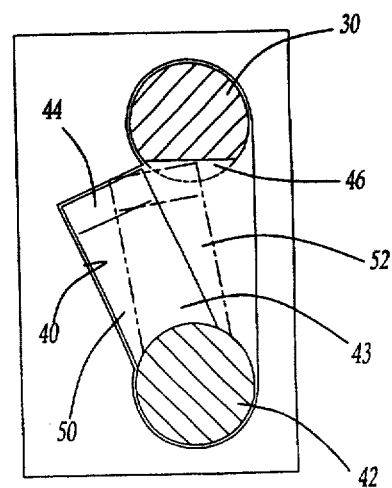

FIG. 4 shows the locked position of FIG. 3. As shown, the locking member 43 and its teeth 44 have moved between the rod teeth 46. The rod 30 is held by a very strong holding force.

As shown in FIG. 5, the locking member 43 has now been pivoted by turning the handle 26 such that its teeth 44 move out of the teeth 46. This position is shown at 50. Once released, the locking portion 43 is spring biased by spring 48 (shown schematically) back to the locked position of FIG. 4. An intermediate position 52 is shown. It should be understood that the size of the teeth 44 relative to the teeth 46 must be designed such that the locking member 43 can move through the intermediate positions 52 back to the locked position shown in FIG. 4.

A preferred embodiment of this invention has been disclosed; however, a worker of ordinary skill in this art would recognize that modifications would come within the scope of this invention. For that reason, the following claims should be studied to determine the true scope and content of this invention.

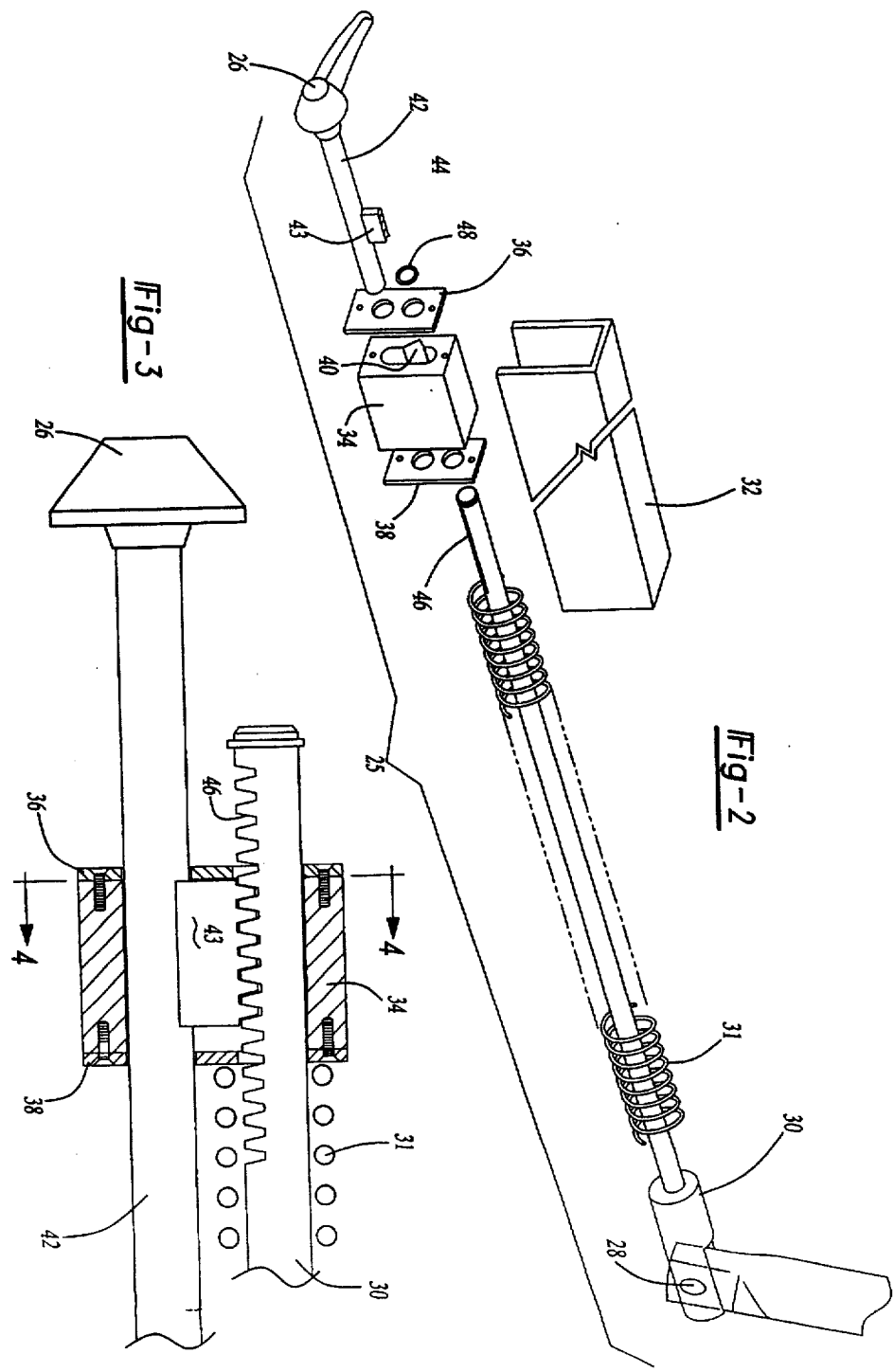

What is claimed is:

1. A seat back locking mechanism comprising:

a rod to be attached to a seat back, said rod having a plurality of incremental teeth at a forward end, and having a pivot mount for attachment to a seat at a rear end;

a lock handle actuating a lock bar, said lock bar carrying a toothed lock member, said toothed lock member having teeth;

a block having a cavity receiving both said rod and said lock bar, and said lock bar being mounted for pivotal movement within said cavity such that said lock member is movable into and out of engagement with said teeth on said toothed rod, and said lock member being biased into engagement with said teeth on said rod, said lock bar and said rod being formed on parallel axes which are spaced from each other, said pivotal movement of said lock bar being about an axis which is parallel to an axis of said rod, but spaced from said axis of said rod; and there being a plurality of said teeth on both of said rod and said lock member, and said teeth being spaced along said axes.

2. A seat locking mechanism as set forth in claim 1, wherein end plates are formed on each end of said block to secure said lock member within said block.

3. A seat actuation mechanism comprising:

a seat back;

a seat bottom, said seat bottom pivotally being attached to said seat back;

a locking mechanism including a rod attached to said seat back, said rod being selectively fixed by a locking mechanism for preventing axial movement of said rod, and hence pivoting movement of said seat back relative to said seat bottom, said locking mechanism including a handle for rotating a bar, said bar and said rod both extending through a block having a cavity, said rod extending along a first axis and said bar pivoting about a second axis, said first and second axes being parallel but offset relative to each other, and teeth on said bar being spring biased into engagement with teeth on said rod, there being a plurality of said teeth on both said rod and said bar, and said teeth being spaced along said axes.

4. A seat actuation mechanism as set forth in claim 3, wherein end plates are formed on each end of said block to secure said lock bar within said block.

* * * * *

UNITED STATES PATENT AND TRADEMARK OFFICE
CERTIFICATE OF CORRECTION

PATENT NO. : 6,045,189
DATED : April 4, 2000
INVENTOR(S) : Schooler

It is certified that error appears in the above-identified patent and that said Letters Patent is hereby corrected as shown below:

Title page,
Showing an illustrative figure, should be deleted and substitute therefor the attached title page.

Delete Drawing Sheets 1-5, and substitute therefor the Drawing Sheets, consisting of Figs. 1-5, as shown on the attached pages.

Signed and Sealed this

Twenty-third Day of October, 2001

Attest:

*Nicholas P. Godici*

NICHOLAS P. GODICI
*Attesting Officer*    *Acting Director of the United States Patent and Trademark Office*

United States Patent [19]
Schooler

[11] Patent Number: 6,045,189
[45] Date of Patent: Apr. 4, 2000

[54] SEAT BACK LOCK WITH PIVOTING LOCKING MEMBER

[76] Inventor: Paul T. Schooler, 16285 Erin, Fraser, Mich. 48026

[21] Appl. No.: 09/150,937

[22] Filed: Sep. 10, 1998

[51] Int. Cl.[7] .................................................. B60N 2/02
[52] U.S. Cl. .................................. 297/375; 297/378.12
[58] Field of Search ........................ 297/375, 362.12, 297/378.12, 378.1

[56] References Cited

U.S. PATENT DOCUMENTS

| | | |
|---|---|---|
| 1,326,275 | 12/1919 | Koerner . |
| 1,889,478 | 11/1932 | Hultgren . |
| 2,170,509 | 8/1939 | Schumpert . |
| 2,283,485 | 5/1942 | Beck . |
| 2,728,379 | 12/1955 | Perry . |
| 2,809,691 | 10/1957 | Norwood et al. . |
| 3,226,158 | 12/1965 | Strien et al. . |
| 3,286,971 | 11/1966 | Walter et al. . |
| 3,709,535 | 1/1973 | Rothermel . |
| 3,954,245 | 5/1976 | Costin . |
| 4,178,037 | 12/1979 | Pickles . |
| 4,257,647 | 3/1981 | Gianessi . |
| 4,389,070 | 6/1983 | Chien . |
| 4,565,404 | 1/1986 | Rauschenberger . |
| 4,898,424 | 2/1990 | Bell ............................. 297/375 X |
| 5,035,466 | 7/1991 | Mathews et al. . |
| 5,080,434 | 1/1992 | Locher . |
| 5,161,856 | 11/1992 | Nishino . |
| 5,320,413 | 6/1994 | Griswold et al. . |
| 5,344,216 | 9/1994 | Suominen . |
| 5,496,092 | 3/1996 | Williams et al. . |
| 5,558,402 | 9/1996 | Yamada . |
| 5,618,083 | 4/1997 | Martone et al. . |
| 5,622,410 | 4/1997 | Robinson . |
| 5,660,440 | 8/1997 | Pejathaya . |

*Primary Examiner*—Milton Nelson, Jr.
*Attorney, Agent, or Firm*—Howard & Howard

[57] ABSTRACT

An improved seat back locking mechanism includes a first toothed rod selectively attached to a seat back. A second toothed member is pivotally received in a block that receives the rod. The second toothed member is spring biased to bring its teeth into engagement with the rod teeth. The second toothed member is selectively rotatable out of engagement with the rod teeth to allow the rod to move, and hence the seat back to pivot over the seat bottom.

4 Claims, 2 Drawing Sheets

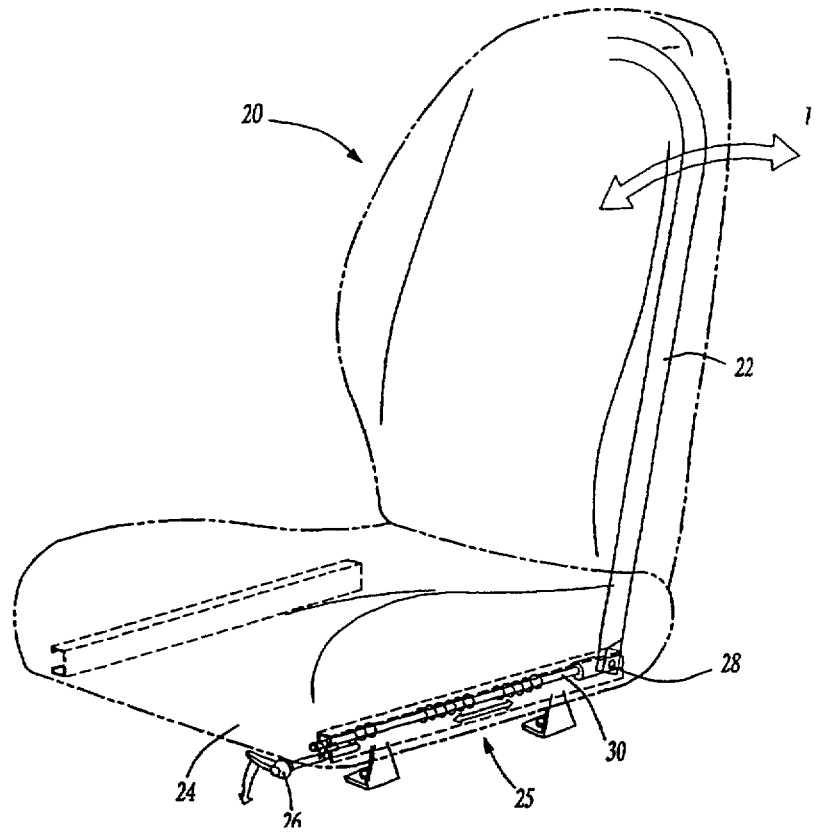

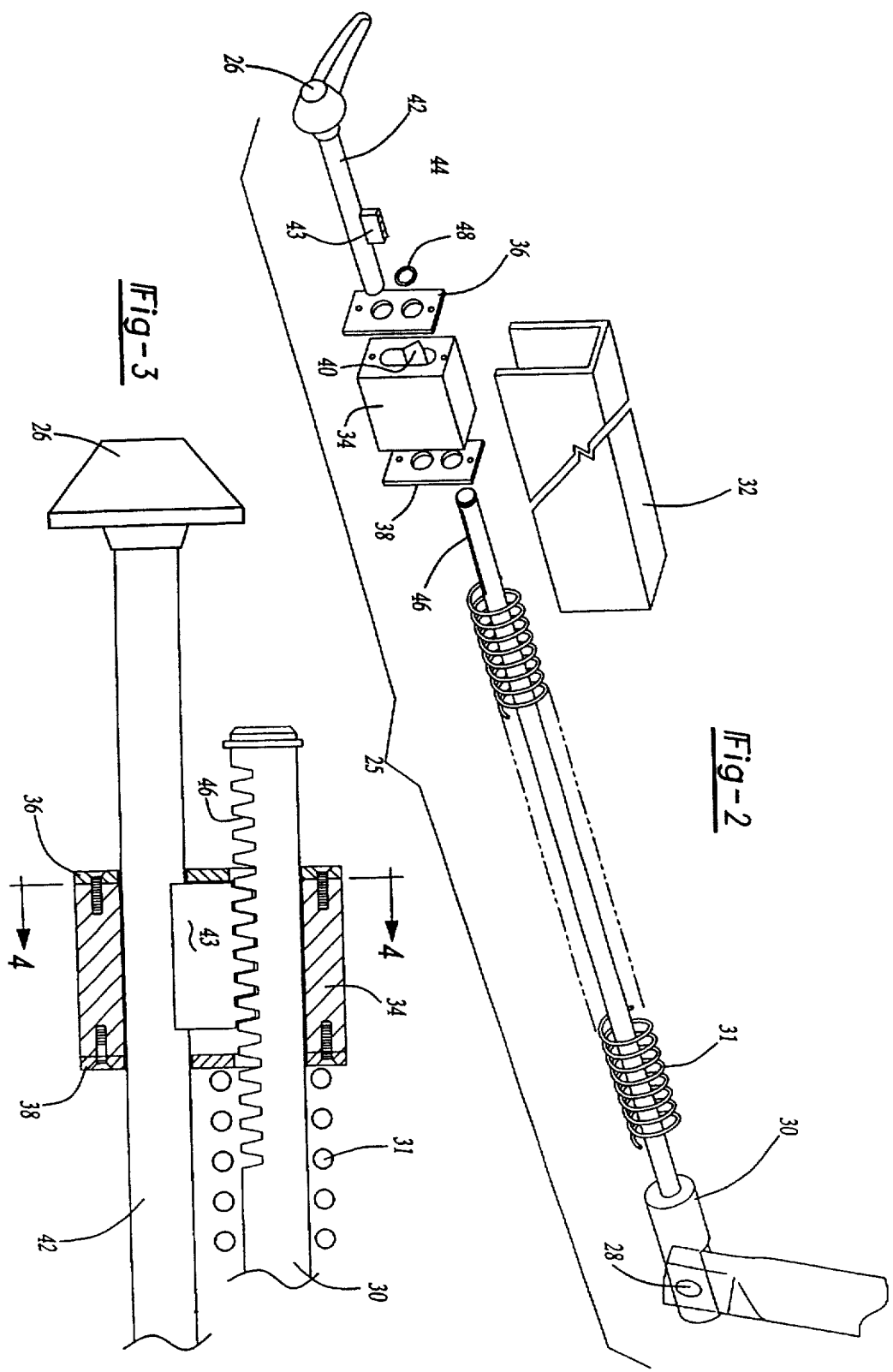

UNITED STATES PATENT AND TRADEMARK OFFICE
CERTIFICATE OF CORRECTION

PATENT NO.   : 6,045,189
DATED        : April 4, 2000
INVENTOR(S)  : Schooler

It is certified that error appears in the above-identified patent and that said Letters Patent is hereby corrected as shown below:

The title page, showing an illustrative figure, should be deleted and substitute therefor the attached title page.

Delete Drawing Sheets 1-5, and substitute therefore the Drawing Sheets, consisting of Figs. 1-5, as shown on the attached pages.

Signed and Sealed this

Fifth Day of February, 2002

Attest:

JAMES E. ROGAN
Attesting Officer     *Director of the United States Patent and Trademark Office*

United States Patent [19]
Schooler

[11] Patent Number: 6,045,189
[45] Date of Patent: Apr. 4, 2000

[54] SEAT BACK LOCK WITH PIVOTING LOCKING MEMBER

[76] Inventor: Paul T. Schooler, 16285 Erin, Fraser, Mich. 48026

[21] Appl. No.: 09/150,937

[22] Filed: Sep. 10, 1998

[51] Int. Cl.⁷ .................................................. B60N 2/02
[52] U.S. Cl. ................................... 297/375; 297/378.12
[58] Field of Search ........................... 297/375, 362.12, 297/378.12, 378.1

[56] References Cited

U.S. PATENT DOCUMENTS

| | | |
|---|---|---|
| 1,326,275 | 12/1919 | Koerner . |
| 1,889,478 | 11/1932 | Hultgren . |
| 2,170,509 | 8/1939 | Schumpert . |
| 2,283,485 | 5/1942 | Beck . |
| 2,728,379 | 12/1955 | Perry . |
| 2,809,691 | 10/1957 | Norwood et al. . |
| 3,226,158 | 12/1965 | Strien et al. . |
| 3,286,971 | 11/1966 | Walter et al. . |
| 3,709,535 | 1/1973 | Rothemel . |
| 3,954,245 | 5/1976 | Costin . |
| 4,178,037 | 12/1979 | Pickles . |
| 4,257,647 | 3/1981 | Gianessi . |
| 4,389,070 | 6/1983 | Chien . |
| 4,565,404 | 1/1986 | Rauschenberger . |
| 4,898,424 | 2/1990 | Bell ........................ 297/375 X |
| 5,035,466 | 7/1991 | Mathews et al. . |
| 5,080,434 | 1/1992 | Locher . |
| 5,161,856 | 11/1992 | Nishino . |
| 5,320,413 | 6/1994 | Griswold et al. . |
| 5,344,216 | 9/1994 | Suominen . |
| 5,496,092 | 3/1996 | Williams et al. . |
| 5,558,402 | 9/1996 | Yamada . |
| 5,618,083 | 4/1997 | Martone et al. . |
| 5,622,410 | 4/1997 | Robinson . |
| 5,660,440 | 8/1997 | Pejathaya . |

*Primary Examiner*—Milton Nelson, Jr.
*Attorney, Agent, or Firm*—Howard & Howard

[57] ABSTRACT

An improved seat back locking mechanism includes a first toothed rod selectively attached to a seat back. A second toothed member is pivotally received in a block that receives the rod. The second toothed member is spring biased to bring its teeth into engagement with the rod teeth. The second toothed member is selectively rotatable out of engagement with the rod teeth to allow the rod to move, and hence the seat back to pivot over the seat bottom.

4 Claims, 2 Drawing Sheets

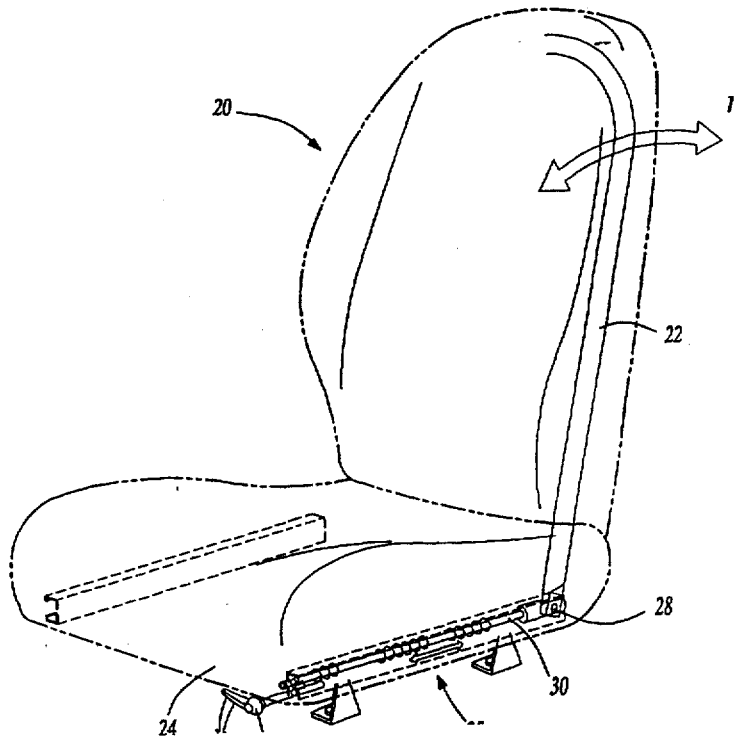

U.S. Patent    Apr. 4, 2000    Sheet 1 of 2    6,045,189